(12) United States Patent
Wang

(10) Patent No.: US 11,795,890 B2
(45) Date of Patent: Oct. 24, 2023

(54) MULTI-STAGE STIRLING CYCLE MACHINE AND A STEADY-STATE OPERATING PARAMETER CONTROL METHOD THEREFOR

(71) Applicant: Li Wang, Beijing (CN)

(72) Inventor: Li Wang, Beijing (CN)

( * ) Notice: Subject to any disclaimer, the term of this patent is extended or adjusted under 35 U.S.C. 154(b) by 0 days.

(21) Appl. No.: 17/918,296

(22) PCT Filed: Apr. 26, 2021

(86) PCT No.: PCT/CN2021/090014
§ 371 (c)(1),
(2) Date: Oct. 11, 2022

(87) PCT Pub. No.: WO2022/007477
PCT Pub. Date: Jan. 13, 2022

(65) Prior Publication Data
US 2023/0193851 A1 Jun. 22, 2023

(30) Foreign Application Priority Data

Jul. 6, 2020 (CN) .......................... 202010638670.1

(51) Int. Cl.
*F02G 1/045* (2006.01)
*F02G 1/044* (2006.01)
*F02G 1/04* (2006.01)

(52) U.S. Cl.
CPC .............. *F02G 1/045* (2013.01); *F02G 1/04* (2013.01); *F02G 1/044* (2013.01); *F02G 2243/30* (2013.01); *F02G 2243/40* (2013.01)

(58) Field of Classification Search
CPC .......... F02G 1/04; F02G 1/043; F02G 1/0435; F02G 1/044; F02G 1/053; F02G 1/055;
(Continued)

(56) References Cited

U.S. PATENT DOCUMENTS 3,928,974 A * 12/1975 Benson ...................... F25B 9/14
60/517
4,044,558 A * 8/1977 Benson ................. F02G 1/0435
60/520

(Continued)

FOREIGN PATENT DOCUMENTS

CN        1932273 A    3/2007
CN     102506513 A    6/2012
(Continued)

OTHER PUBLICATIONS

International Search Report (and its English translation) and Written Opinion for PCT/CN2021/090014 (published as WO2022/007477) which is the parent application to the instant application; dated Jul. 26, 2021; 10 pages.

(Continued)

*Primary Examiner* — Mickey H France
(74) *Attorney, Agent, or Firm* — Harness, Dickey & Pierce, PLC; Anthony G. Fussner

(57) ABSTRACT

A multi-stage Stirling cycle machine and a steady-state operating parameter control method therefor are disclosed. In the Stirling cycle machine, a mechanical energy input piston, a mechanical energy transfer double-acting free piston, and a mechanical energy output piston constitute a plurality of Stirling working units which are arranged in stages. The mechanical energy input piston is connected to a mechanical energy input apparatus. The mechanical energy output piston is connected to a mechanical energy output apparatus. When the Stirling cycle machine is used as an engine, a relatively small amount of mechanical energy is input into a mechanical energy input piston in a set of pistons, the mechanical energy is amplified by a multi-stage Stirling unit, and a relatively large amount of mechanical energy is then output by a mechanical energy output piston.

10 Claims, 3 Drawing Sheets

(58) Field of Classification Search
CPC .. F02G 1/057; F02G 2243/02; F02G 2243/24; F02G 2243/30; F02G 2243/40
See application file for complete search history.

(56) References Cited

U.S. PATENT DOCUMENTS

| | | | | |
|---|---|---|---|---|
| 4,367,625 | A | * | 1/1983 | Vitale ................... F02G 1/0435 60/520 |
| 4,885,017 | A | * | 12/1989 | Fleischmann ............. F25B 9/14 60/526 |
| 5,456,076 | A | | 10/1995 | Zornes |
| 6,389,819 | B1 | * | 5/2002 | Zhu ......................... F25B 9/145 60/520 |
| 7,171,811 | B1 | | 2/2007 | Berchowitz et al. |
| 9,528,467 | B2 | | 12/2016 | Dadd |
| 2006/0254270 | A1 | | 11/2006 | Tanaka |
| 2011/0303637 | A1 | | 12/2011 | Araki et al. |
| 2016/0017843 | A1 | * | 1/2016 | Whittaker ............... F02G 1/057 60/522 |

FOREIGN PATENT DOCUMENTS

| | | |
|---|---|---|
| CN | 102685687 A | 9/2012 |
| CN | 104114841 A | 10/2014 |
| CN | 106917696 A | 7/2017 |
| CN | 107654311 A | 2/2018 |
| CN | 207333051 U | 5/2018 |
| CN | 109915278 A | 6/2019 |
| CN | 111779590 A | 10/2020 |
| JP | 2010261426 A | 11/2010 |
| WO | WO-2009103955 A2 | 8/2009 |

OTHER PUBLICATIONS

Chinese First Office Action (and its English translation) for CN2020106386701 which is the parent application to the instant application; dated Mar. 4, 2021; 7 pages.

Notification of Going Through the Formalities of Registration and Notification of Granting Invention Patent Right and its English translation for CN2020106386701 which is the parent application to the instant application; dated Aug. 5, 2022, 6 pages.

* cited by examiner

MULTI-STAGE STIRLING CYCLE MACHINE AND A STEADY-STATE OPERATING PARAMETER CONTROL METHOD THEREFOR

This patent application is a U.S. national stage filing under 35 U.S.C. § 371 of PCT International Application No. PCT/CN2021/090014 filed Apr. 26, 2021, which claims the benefit and priority of Chinese application No. 202010638670.1 filed Jul. 6, 2020 (now Chinese patent No. CN111779590 granted Sep. 2, 2022). The disclosures of the applications identified in this paragraph are incorporated herein by reference in their entirety.

TECHNICAL FIELD

The present invention relates to a field of Stirling cycle machine, and in particular, to a multi-stage Stirling cycle machine and a steady-state operating parameter control method therefor.

BACKGROUND

The Stirling engine using double-acting free pistons in the prior art (as shown in FIG. 1), multiple identical pistons are connected to each other through coolers, regenerators and heaters to constitute multiple identical Stirling working units, the mechanical energy and reciprocating motion between the pistons form an annular circulation transmission between the pistons. This Stirling engine using double-acting free pistons has several disadvantages: first, each double-acting free piston needs to output some mechanical energy to the outside, and the parts that output mechanical energy will increase the complexity of the equipment; second, the connection between the double-acting free pistons requires providing connecting parts such as elbows and gas collectors, etc., which will increase the dead volume and the difficulty of processing and manufacturing of the large-diameter Stirling unit; third, the pressure difference of the gases in different closed spaces cannot be used to bear the weight of the piston, and a spring needs to be set to bear the weight of the piston and control the balance position of the piston; fourth, the control of the piston movement process is difficult and the adjustment performance is poor; fifth, the anti-interference ability is poor, and the adaptability to temperature fluctuation, temperature difference between units and piston pump gas, etc. is poor; sixth, the existing Stirling engine cannot achieve a balance between large-scale and manufacturing costs, in general, there is a certain proportional relationship between the diameter and the stroke of the piston of a Stirling engine, when the diameter of the piston is increased, the stroke of the piston needs to be increased, and the increase of the stroke of the piston will cause adverse effects such as increased gas flow resistance, etc., which limit the large-scale of the Stirling engine, the unit cost of the Stirling engine cannot be reduced by the large-scale.

In order to overcome the above-mentioned disadvantages of the existing Stirling engine using double-acting free pistons, the invention provides a Stirling cycle machine with simple structure, convenient control, strong adjustment performance, strong anti-interference ability and suitable for large-scale.

SUMMARY

The purpose of the invention is to research and design a Stirling cycle machine with simple structure, convenient control, strong adjustment performance, strong anti-interference ability and suitable for large-scale. The specific structure is as follows:

A multi-stage Stirling cycle machine, comprising at least one set of pistons and cylinders, the one set of pistons comprises one mechanical energy input piston, at least one mechanical energy transfer double-acting free piston, and one mechanical energy output piston, one set of pistons constitutes a Stirling working unit with at least two stages.

Specifically, a multi-stage Stirling cycle machine of the present invention has at least one set of piston working units, and one set of piston working units comprises:

(a) a first cylinder 101, and one mechanical energy input piston 2 that is axially movable in the first cylinder 101;

(b) a second cylinder 102, and one mechanical energy transfer double-acting free piston 6 that is axially movable in the second cylinder 102;

(c) last stage cylinder 103, and one mechanical energy output piston 7 that is axially movable in the last stage cylinder 103;

The first cylinder 101 is connected to the second cylinder 102 in the axial direction through a first cooler 3, a first regenerator 4 and a first heater 5, the second cylinder 102 is connected to the last stage cylinder 103 in the axial direction through a second cooler 3', a second regenerator 4' and a second heater 5', constituting a Stirling working unit with two stages.

Further, a mechanical energy input apparatus 1 is arranged at one end of the multi-stage Stirling cycle machine, and the mechanical energy input apparatus 1 is connected to the mechanical energy input piston 2; a mechanical energy output apparatus 8 is arranged at the other end of the multi-stage Stirling cycle machine, and the mechanical energy output apparatus 8 is connected to the mechanical energy output piston 7.

Further, the lower end of the second cylinder 102 is connected to mechanical energy transfer double-acting free pistons and cylinders which constitute at least one Stirling working unit through coolers, regenerators and heaters, a mechanical energy output apparatus 8 is arranged on the mechanical energy output piston 7 of the last stage Stirling working unit, constituting one multi-stage Stirling cycle machine system with at least three stages.

The mechanical energy input apparatus is selected from various apparatuses that can drive the mechanical energy input piston to reciprocate, such as an electric motor, cyclically changing gas pressure difference, cyclically changing liquid pressure difference, a Stirling engine, connecting rod with mechanical energy output piston, etc., or a combination of several modes.

The mechanical energy output apparatus is selected from various apparatuses for the output or utilization of mechanical energy, which can drive the mechanical energy output piston to reciprocate, such as power generator, cyclically changing gas pressure difference, cyclically changing liquid pressure difference, Stirling heat pumps, connecting rod with mechanical energy input piston, etc., or a combination of several modes.

The operation mode of the multi-stage Stirling cycle machine of the present invention is: driven by the mechanical energy input apparatus, the mechanical energy input piston reciprocates in the cylinder to drive the connected mechanical energy transfer double-acting free piston to reciprocate in the cylinder, the mechanical energy transfer double-acting free piston drives the next stage piston to reciprocate in the cylinder step by step, the mechanical energy output piston reciprocates in the cylinder under the driving of the mechanical energy transfer double-acting free piston, and outputs the mechanical energy through the mechanical energy output apparatus.

In order to achieve the control of a system comprising multiple free pistons interacting with each other, the invention innovatively introduces one mechanical energy input apparatus into one set of pistons, so that the movement of the plurality of pistons becomes a dynamic system that is periodically excited by the mechanical energy input and responds in a steady state.

The multi-stage Stirling cycle machine of the present invention comprises a plurality of free pistons interacting with each other, it is critical to control the movement of each piston and make it reach a steady operating state, on the basis of mastering the motion law of the piston of the multi-stage Stirling cycle machine of the present invention, the required piston motion mode of the present invention is realized by means of parameter calculation, selection and design, such that the multi-stage Stirling cycle machine can adapt to changes in an input condition and adjust an output power as required.

The steady-state operating parameter control method of the Stirling cycle machine of the present invention is as follows:
(1) selecting the amplitude of the piston and the phase angle between the pistons as needed, and the phase angle between the pistons should not exceed 75°;
(2) selecting the average length of the back pressure chamber of the mechanical energy input piston and the average length of the back pressure chamber of the mechanical energy output piston, the average length should be such that the volume of the back pressure chamber is 3-8 times the volume of the adjacent Stirling unit, the smaller the ratio, the greater the required mass of mechanical energy input piston and mechanical energy output piston;
(3) selecting the parameters of the cooler, regenerator and heater and calculating the volume of the cooler, regenerator and heater corresponding to unit area of the piston, the method of selection and calculation can refer to the method of selection and calculation of the general Stirling cycle machine, and considering factors in the lower unit cost of the Stirling cycle machine of the present invention;
(4) calculating and determining average pressure, area of each piston, piston mass of each Stirling unit by using forced vibration equations;
(5) adjusting the operating parameters of the multi-stage Stirling engine of the present invention.

Further, the calculating method of the step (4) is as follows:
a. initially selecting the number of stages of the multi-stage Stirling cycle machine, the average pressure of each closed space and the area of each piston according to the mode that the area of the piston in the expansion chamber of the engine unit is larger than that of the piston in the compression chamber of the engine unit;
b. under the condition that the area of the mechanical energy output piston remains unchanged, adjusting the area of other pistons to make that the resultant force acting on each mechanical energy transfer double-acting free piston is 0 by using the equivalent linear stiffness and damping calculation when this piston runs to the equilibrium position;
c. calculating the driving force of the mechanical energy input apparatus and the damping of the mechanical energy output apparatus according to the condition that the resultant force acting on this piston is 0 by using the equivalent linear stiffness and damping calculation when the piston runs to the equilibrium position;
d. calculating the mass of each piston according to the resultant force of the acting force calculated by using the equivalent linear stiffness and the acceleration of the piston when each piston runs to the maximum displacement;
e. for vertically arranged multi-stage Stirling engines, adjusting the average pressure of each Stirling working unit and back pressure chamber according to the mass of each piston;
f. repeating the calculation from step b to step e until the ideal calculation result is obtained;
g. calculating mechanical energy input power and mechanical energy output power;
h. calculating the power loss caused by the efficiency of the mechanical energy input apparatus, and judging whether the ratio of the power loss caused by the efficiency of the mechanical energy input apparatus to the total output power meets the requirement, generally, in order to keep the power loss caused by the efficiency of the mechanical energy input apparatus within 5% of the total output power, the mechanical energy output power is required to be more than 10 times the mechanical energy input power;
i. if the ratio of the power loss caused by the efficiency of the mechanical energy input apparatus to the total output power does not meet the requirement, increasing the number of stages of the multi-stage Stirling engine and repeating the above calculations.

Further, the steps of adjusting the operating parameters of the multi-stage Stirling engine of the present invention in the above step (5) are as follows:
A. adjusting the mechanical energy output power by adjusting the mechanical energy input power;
B. adjusting the operating frequency and required adjusting the average pressure of the working gas at the same time;
C. adjusting the phase angle between the pistons and required adjusting the volume of back pressure chamber of the mechanical energy input piston and the volume of back pressure chamber of the mechanical energy output piston at the same time;
D. when the ratio of the absolute temperature of the heat source and the cold source increases, in order to maintain the output power unchanged, the mechanical energy input power needs to be reduced;
E. when the ratio of the absolute temperature of the heat source and the cold source decreases, in order to maintain the input power unchanged, the mechanical energy output power needs to be reduced.

Under the condition of small compression ratio, the variation of the pressure in each enclosed space of the multi-stage Stirling cycle machine with the displacement of the piston is approximated as a linear relationship; replacing the mechanical loss of each Stirling unit and the influence of the mechanical energy output apparatus with the equivalent damping acting on each piston; the driving force of the mechanical energy input apparatus is expressed as a periodic excitation. The forced vibration equation of each piston is established, and a set of forced vibration equations of the system are formed. A set of forced vibration equations are expressed by mass of per unit area of piston, pressure, damping of per unit area of piston.

A set of forced vibration equations of Stirling cycle machine:

$$m_1x_1''+c_1x_1'+(k_{10}+k_{12})x_1-k_{21}x_2=q\sin(\omega t)$$

$$m_2x_2''+c_2x_2'-k_{12}x_1+(k_{21}+k_{23})x_2-k_{32}x_3=0$$

$$\cdots$$

$$m_ix_i''+c_ix_i'-k_{(i-1)i}x_{(i-1)}+(k_{i(i-1)}+k_{i(i+1)})x_i-k_{(i+1)i}x_{(i+1)}=0$$

$$\cdots$$

$$m_nx_n''+c_nx_n'-k_{(n-1)n}x_{(n-1)}+(k_{n(n-1)}+k_{n(n+1)})x_n=0$$

Wherein, m1, m2, $\cdots$, mi, $\cdots$, mn are the mass of per unit area of the mechanical energy input piston (2), each mechanical energy transfer double-acting free piston and the mechanical energy output piston (7);

ω is the circular frequency of the driving force of the mechanical energy input apparatus;

q is the maximum of the force of the mechanical energy input apparatus acting on the unit mechanical energy input piston;

t is time;

$x_1$, $x_2$, $\cdots$, $x_i$, $\cdots$, $x_n$ are the displacements of the mechanical energy input piston (2), each mechanical energy transfer double-acting free piston and the mechanical energy output piston (7), which are functions of time t;

$x_1'$, $x_2'$, $\cdots$, $x_i'$, $\cdots$, $x_n'$ are the speeds of the mechanical energy input piston (2), each mechanical energy transfer double-acting free piston and the mechanical energy output piston (7);

$x_1''$, $x_2''$, $\cdots$, $x_i''$, $\cdots$, $x_n''$ are the accelerations of the mechanical energy input piston (2), each mechanical energy transfer double-acting free piston and the mechanical energy output piston (7);

$c_1$, $c_2$, $\cdots$, $c_i$, $\cdots$, $c_n$ are the equivalent damping of per unit area of piston of the mechanical energy input piston (2), each mechanical energy transfer double-acting free piston and the mechanical energy output piston (7);

$k_{10}$, $k_{12}$ are changes of pressure in the closed space on the upper and lower sides of the piston caused by the unit displacement of $x_1$, $k_{21}$, $k_{23}$, $k_{32}$, $k_{34}$ $\cdots$ and so on.

Converting the set of forced vibration equations of the Stirling cycle machine to obtain the set of equivalent equations, and the conversion process is:

Assuming:

f=q×1, wherein, 1 represents the area with a value of 1, the same below $$y_1=x_1$$

$$m_{y1}=m_1\times1$$

$$c_{y1}=c_1\times1$$

$$k_1=k_{10}\times1$$

$$y_2=x_2(k_{21}/k_{12})$$

$$m_{y2}=m_2(k_{12}/k_{21})\times1$$

$$c_{y2}=c_2(k_{12}/k_{21})\times1$$

$$k_2=k_{12}\times1$$

$$y_3=x_3(k_{21}/k_{12})(k_{32}/k_{23})$$

$$m_{y3}=m_3(k_{12}/k_{21})(k_{23}/k_{32})\times1$$

$$c_{y3}=c_3(k_{12}/k_{21})(k_{23}/k_{32})\times1$$

$$k_3=k_{23}(k_{12}/k_{21})\times1$$

$$\cdots$$

$$y_i=x_i(k_{21}/k_{12})(k_{32}/k_{23})\cdots(k_{i(i-1)}/k_{(i-1)i})$$

$$m_{yi}=m_i(k_{12}/k_{21})(k_{23}/k_{32})\cdots(k_{(i-1)i}/k_{i(i-1)})\times1$$

$$c_{yi}=c_i(k_{12}/k_{21})(k_{23}/k_{32})\cdots(k_{(i-1)i}/k_{i(i-1)})\times1$$

$$k_i=k_{(i-1)i}(k_{12}/k_{21})(k_{23}/k_{32})\cdots(k_{(i-2)(i-1)}/k_{(i-1)(i-2)})\times1$$

$$\cdots$$

Substituting into the set of forced vibration equations of the Stirling cycle machine to obtain the set of equivalent equations:

$$m_{y1}y_1''+c_{y1}y_1'+(k_1+k_2)y_1-k_2y_2=f\sin(\omega t)$$

$$m_{y2}y_2''+c_{y2}y_2'-k_2y_1+(k_2+k_3)y_2-k_3y_3=0$$

$$\cdots$$

$$m_{yi}y_i''+c_{yi}y_i'-k_iy_{(i-1)}+(k_i+k_{(i+1)})y_i-k_{(i+1)}y_{(i+1)}=0$$

$$\cdots$$

$$m_{yn}y_n''+c_{yn}y_n'-k_ny_{(n-1)}+(k_n+k_{(n+1)})y_n=0$$

The structural form of the set of equivalent equations is the same as the set of forced vibration equations of conventional multi-degree-of-freedom system, therefore, an equivalent multi-degree-of-freedom system constituted of mass points and ordinary springs can be constructed, so that the equivalent set of forced vibration equations of conventional multi-degree-of-freedom system and the set of equivalent equations are the same. From the characteristics of the set of equivalent equations, it can be known that the equivalent multi-degree-of-freedom system is similar in structure to the mechanical system of Stirling cycle machines, the mass of each node is equal to the mass of per unit area of the piston multiplies by the corresponding conversion factor, the damping acting on each node is equal to the damping of per unit area of the piston multiplies by the corresponding conversion factor. The stiffness of each spring is related to the parameters of the Stirling unit. The equivalent multi-degree-of-freedom system of the multi-stage Stirling cycle machine of the present invention is a chain system formed by mass points connected by springs in sequence.

The law of motion of the equivalent multi-degree-of-freedom system under the action of periodic excitation can be expressed as the solutions of the set of equivalent equations, the solutions of the set of forced vibration equations of the Stirling cycle machine can be obtained by the solutions of the set of equivalent equations, the solutions of the set of forced vibration equations of the Stirling cycle machine express law of motion of each piston of the multi-stage Stirling cycle machine. Therefore, it can be deduced that the piston of a multi-stage Stirling cycle machine has law of motion which is similar to the propagation of mechanical waves according to the law of motion of the equivalent multi-degree-of-freedom system. Such law of motion of the piston can meet the working needs of the Stirling cycle machine.

In order to realize that the piston operates in the required mode, it is necessary to determine the mathematical relationship between mass of per unit area of the piston, pressure change caused by displacement of per unit of the piston, and damping of per unit area of the piston. The mathematical relationship can be obtained by expressing the required operation mode of the piston as a steady-state solution of the equation, and substituting the steady-state solution into the forced vibration equation. According to the working needs and operating law of the Stirling cycle machine, selecting the desired amplitude of each piston and the phase angle between the pistons, expressing the selected operation mode as the steady-state solution of the forced vibration equation of the Stirling cycle machine, and substituting the steady-state solution into the forced vibration equation of the multi-stage Stirling cycle machine, the mathematical relationship between mass of per unit of the piston, pressure change caused by displacement of per unit of the piston and damping of per unit area of the piston can be obtained. The specific process is as follows:

Assuming steady-state solution of set of forced vibration equations of the Stirling cycle machine:

$$x_1 = X_1 \sin(\omega t - \theta)$$

$$x_2 = X_2 \sin(\omega t - \theta - \theta_1)$$

$$x_3 = X_3 \sin(\omega t - \theta - \theta_1 - \theta_2)$$

$X_1$, $X_2$, $X_3$ are ½ of the amplitude of each piston $\theta$ is the phase angle between the mechanical energy input piston and the driving force of the mechanical energy input apparatus $\theta_1$, $\theta_2$ are the phase angles between the pistons Substituting the steady-state solution into the set of forced vibration equations of the Stirling cycle machine, the mathematical relationship between mass of per unit of the piston, pressure change caused by displacement of per unit of the piston and damping of per unit area of the piston can be obtained. The mathematical relationship can be summarized as: calculating according to the given period, phase angle and amplitude of the piston, the following conditions must be satisfied between mass of per unit of the piston, pressure change caused by displacement of per unit of the piston and damping of per unit area of the piston:

(1) when any piston runs to the equilibrium position, the resultant force acting on this piston is 0 by using the equivalent linear stiffness and damping calculation;

(2) when any piston runs to the maximum displacement, the resultant force acting on the piston calculated by using the equivalent linear stiffness is equal to the product of the piston mass and the acceleration, the acceleration is the acceleration calculated according to the given period and amplitude of the piston.

The equivalent linear stiffness can be calculated according to the pressure change of the Stirling unit caused by the small displacement of the piston, the calculation method is similar to that of the conventional Stirling cycle machine, and will not be described in detail here; the equivalent linear damping can be calculated by weighting the mechanical loss of each Stirling unit to the corresponding piston, and at the same time considering the effect of the mechanical energy output apparatus, which can be realized by a conventional calculation method, and will not be described in detail here.

The multi-stage Stirling cycle machine of the present invention that satisfying the above conditions has the following operating laws under the condition of small compression ratio:

1. operating according to the given period, the motion of the piston is transmitted from the mechanical energy input piston to the mechanical energy output piston in a manner similar to mechanical waves, and the mechanical energy is amplified when passing through the Stirling engine unit;

2. operating according to the given period, the mechanical energy output piston will not cause the reflection of the mechanical wave, and the piston motion satisfies the propagation law similar to the mechanical wave;

3. when each Stirling unit adopts the same piston area ratio, compression ratio, phase difference, amplitude of piston and other parameters, for a Stirling unit with negligible mechanical losses, the area ratio of the expansion piston to the compression piston is equal to the effective absolute temperature ratio in the expansion chamber and the compression chamber. Piston area ratio decreases with increasing mechanical losses.

The set of forced vibration equations of multi-stage Stirling cycle machine of the present invention satisfying the above relationship has a unique steady-state solution, and the steady-state solution of the set of forced vibration equations of Stirling engine of the prior art established by the same method is not unique, this shows that the multi-stage Stirling cycle machine of the present invention is more stable and controllable than the prior art.

Further, the calculation and method of parameter adjustment of the multi-stage Stirling heat pump is determined by the same method as the above calculation principle.

The multi-stage Stirling cycle machine of the present invention has obvious technical advantages, which are mainly reflected in the following aspects:

1. the multi-stage Stirling engine of the present invention can make the mechanical energy output power reach more than 10 times of the mechanical energy input power by setting enough stages, it realizes several outputs of mechanical energy of the multi-stage Stirling engine units, which has obvious application value than the existing Stirling engine. The mechanical energy input piston reciprocates in the cylinder under the driving of the mechanical energy input apparatus, the motion of the piston is transmitted to the mechanical energy output piston in a manner similar to mechanical waves, and the mechanical energy is output through the mechanical energy output apparatus. When used as a Stirling engine, the mechanical energy is amplified step by step when transmitted through the Stirling unit, therefore, even if the temperature difference between the cold source and the heat source is small, enough stages can be set to make the mechanical energy output power reach 10 times or even higher than the mechanical energy input power.

2. the multi-stage Stirling cycle machine of the present invention can realize the effect of mechanical energy transfer double-acting free piston canceling components (such as the piston rod, etc.) by optimizing the parameters of each working unit, making the structure simpler and more compact. Setting the parameters of each Stirling working unit to make the mechanical energy transfer double-acting free piston to input the mechanical energy from the connected one stage Stirling working unit, in addition to overcoming the mechanical loss of the reciprocating motion of the piston and the working gas, all the mechanical energy is output to the connected next stage Stirling working unit during a complete operating period, realizing that the mechanical energy transfer double-acting free piston can only reciprocate under the action of the pressure change of the working gas of the Stirling working unit on both sides so as to achieve the purpose of canceling the apparatus (such as the piston rod, etc.). In one set of pistons, piston rod can be provided only on the mechanical energy input piston and mechanical energy output piston arranged at both ends to connect the mechanical energy input apparatus and the mechanical energy output apparatus.

3. the multi-stage Stirling cycle machine of the present invention is suitable for using large-diameter pistons. The multi-stage Stirling cycle machine of the present invention can arrange all pistons, coolers, regenerators and heaters on a straight line, and each Stirling working unit is located between two pistons, excluding auxiliary connecting components (such as elbows, etc.), the ratio of dead volume will not increase due to the increase of the piston diameter, so that the Stirling cycle machine of the present invention does not need to increase the piston stroke when the piston diameter is increased, this feature makes the Stirling cycle machine of the present invention suitable for using large-diameter pistons.

4. the multi-stage Stirling cycle machine of the present invention does not need to be provided with a spring bearing the weight of the piston and controlling the balance position of the piston, which simplifies the structure of the equipment. The working units of the multi-stage Stirling cycle machine of the present invention are not cyclically connected, and the Stirling units at all stages are not required to use the same average pressure, therefore, adjusting the gas amount of each closed space according to the position of the piston can achieve the effect of controlling the balance position of each piston and using the pressure difference of the working gas to bear the weight of the piston. The above features make it unnecessary for the Stirling cycle machine of the present invention to provide the piston with a spring bearing the weight of the piston and controlling the balance position of the piston.

5. the multi-stage Stirling cycle machine of the present invention has very good adjustable performance and anti-interference ability. After simulation calculation, adjusting the input power of the mechanical energy input apparatus can increase the output power of the engine from 10% of the design power to 95% of the design power in 3-4 periods. The invention can be used to manufacture a Stirling engine with very good anti-interference ability, after simulation calculation and adjusting the input parameters within a reasonable range, the Stirling engine can be smoothly converted to a new stable operating state within 3-4 periods, there is no abnormal change in each operating state under the new working conditions.

6. the multi-stage Stirling cycle machine of the present invention can be widely used in the fields of waste heat power generation, renewable energy power generation and the like, and is suitable for improving the energy utilization efficiency by means of cogeneration. The multi-stage Stirling cycle machine of the present invention does not require the Stirling units at all stages to adopt the same temperature, and the medium of heat source or cold source can be passed through a plurality of heaters or coolers in series, so as to achieve the purpose of improving energy utilization efficiency; various heat sources or cold sources can be used in a set of pistons to achieve the purpose of multi-purpose or to provide waste heat of various temperatures. The simple structure of the multi-stage Stirling cycle machine of the present invention can significantly reduce the processing and manufacturing cost of the equipment, and the equipment cost of per unit power can be reduced by greatly increasing the diameter of the piston.

After calculation, when the temperature of heat source reaches 300° C. and the power of single machine reaches 300 kW, the return on investment in 2-3 years can be reached by using the Stirling engine for waste heat recovery manufactured by the present invention.

The multi-stage Stirling engine manufactured by the present invention can be used for waste heat power generation, such as waste heat power generation by using the exhaust of internal combustion engine, biogas power generation and landfill gas power generation, etc., generally, an internal combustion engine is used and the temperature of exhaust of the internal combustion engine is relatively high, adding a Stirling engine and waste heat power generation by using the exhaust of internal combustion engine can increase the power generation by 10-15% while meeting the needs (such as insulation of biogas tank, etc.).

The multi-stage Stirling engine manufactured by the present invention can be used for waste power generation and renewable fuel power generation, for example, it is used in various projects that are not suitable for the use of turbine generators because of their small scale, building small-scale waste power generation, agricultural and forestry biomass power generation and other devices to realize nearby disposal and utilization of waste and renewable fuels and greatly reduce the cost of collecting, storing, and transporting of waste and renewable fuels.

The multi-stage Stirling engine manufactured by the present invention can be used to build a distributed solar energy cogeneration apparatus, which can provide waste heat (such as hot water, etc.) while generating electricity and greatly improve the benefit of utilization of solar light and heat. After the heat storage system is installed, the apparatus can be used as a security power supply to continuously supply power to key facilities in the factory or park in the case of an external power supply failure.

The multi-stage Stirling engine manufactured by the present invention can be used to build a small-scale cogeneration apparatus, which can provide waste heat (such as hot water, etc.) while generating electricity. For example, converting a small-scale heating boiler to a cogeneration apparatus.

The multi-stage Stirling engine manufactured by the present invention can be used for power supply of the microgrid, and taking advantage of its large range of power adjustment and fast speed of adjustment, combining with the obvious advantages of stored heat compared to stored electricity, the cost of energy storage can be greatly reduced.

DRAWINGS

Wherein, 1—mechanical energy input apparatus, 2—mechanical energy input piston, 3—first cooler, 4—first regenerator, 5—first heater, 3'—second cooler, 4'—second regenerator, 5'—second heater, 6—mechanical energy transfer double-acting free piston, 7—mechanical energy output piston, 8—mechanical energy output apparatus; 101—first cylinder, 102—second cylinder, 103—last stage cylinder; 001—first-stage Stirling working unit, 002—second-stage Stirling working unit, 003—third-stage Stirling working unit, 004—fourth-stage Stirling working unit, 005—fifth-stage Stirling working unit, 006—sixth-stage Stirling working unit, 007—seventh-stage Stirling working unit.

DETAILED DESCRIPTION

Embodiment 1

Figure 1:
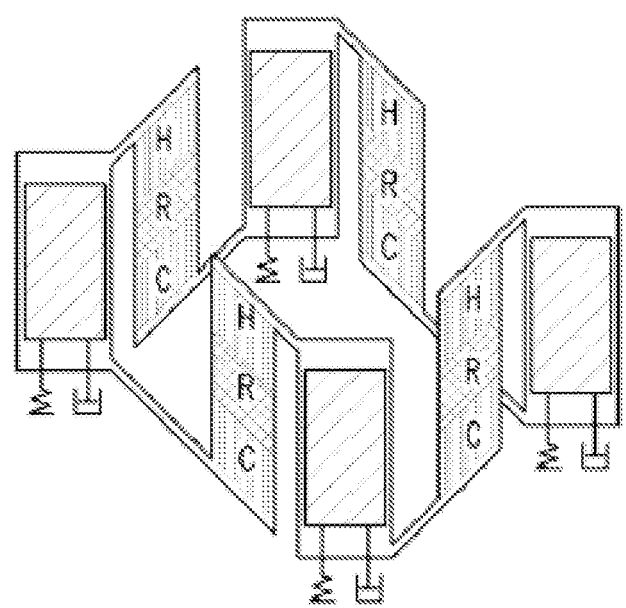
FIG. 1 is the schematic diagram of the structure of the Stirling engine in the prior art.
Figure 2:
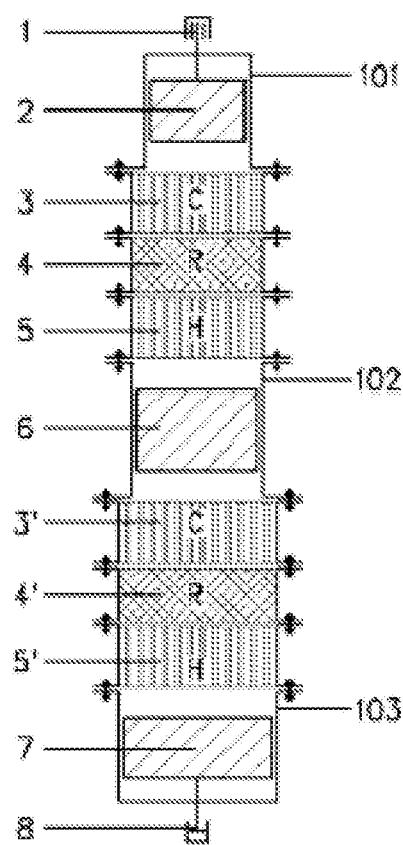
FIG. 2 is the schematic diagram of the structure of the two-stage Stirling cycle machine according to the present invention.

A multi-stage Stirling cycle machine (as shown in FIG. 2), a mechanical energy input apparatus 1 is arranged at one end thereof, the mechanical energy input apparatus 1 is connected to a mechanical energy input piston 2, and the mechanical energy input piston 2 is arranged in a first cylinder 101; the first cylinder 101 is connected to a second cylinder 102 through a first cooler 3, a first regenerator 4 and a first heater 5, a mechanical energy transfer double-acting free piston 6 is arranged in the second cylinder 102; the second cylinder 102 is connected to a last stage cylinder 103 through a second cooler 3', a second regenerator 4' and a second heater 5', a mechanical energy output piston 7 is arranged in the last stage cylinder 103; the other end of the mechanical energy output piston 7 is connected to the mechanical energy output apparatus 8. One closed working space is formed between the mechanical energy input piston 2 located in the first cylinder 101 and the mechanical energy transfer double-acting free piston 6 located in the second cylinder 102, constituting a first-stage Stirling working unit; the mechanical energy transfer double-acting free piston 6 located in the second cylinder 102 and the mechanical energy output piston 7 located in the last stage cylinder 103 form another closed working space, constituting a second-stage Stirling working unit. The mechanical energy input apparatus 1 is selected from various apparatuses that can drive the mechanical energy input piston to reciprocate, such as an electric motor, cyclically changing gas pressure difference, cyclically changing liquid pressure difference, a Stirling engine, etc., or a combination of several modes. The mechanical energy output apparatus is selected from various apparatuses for the output or utilization of mechanical energy, which can drive the mechanical energy output piston to reciprocate, such as power generator, cyclically changing gas pressure difference, cyclically changing liquid pressure difference, Stirling heat pumps, etc., or a combination of several modes. The above structures form one Stirling cycle machine of Stirling working units with two stages.

Embodiment 2

A multi-stage Stirling cycle machine, a mechanical energy input apparatus 1 is arranged at one end thereof, the mechanical energy input apparatus 1 is connected to a mechanical energy input piston 2, and the mechanical energy input piston 2 is arranged in a first cylinder 101; the first cylinder 101 is connected to a second cylinder 102 through a first cooler 3, a first regenerator 4 and a first heater 5, a mechanical energy transfer double-acting free piston 6 is arranged in the second cylinder 102; the second cylinder 102 is connected to a third cylinder through a second cooler 3', a second regenerator 4' and a second heater 5', a mechanical energy transfer double-acting free piston is arranged in the third cylinder; the third cylinder is connected to a last stage cylinder 103 through a cooler, a regenerator and a heater, a mechanical energy output piston 7 is arranged in the last stage cylinder 103; the other end of the mechanical energy output piston 7 is connected to the mechanical energy output apparatus 8. One closed working space is formed between the mechanical energy input piston 2 located in the first cylinder 101 and the mechanical energy transfer double-acting free piston 6 located in the second cylinder 102, constituting a first-stage Stirling working unit; the mechanical energy transfer double-acting free piston 6 located in the second cylinder 102 and the mechanical energy transfer double-acting free piston located in the third cylinder form one closed working space, constituting a second-stage Stirling working unit; the mechanical energy transfer double-acting free piston located in the third cylinder and the mechanical energy output piston 7 located in the last stage cylinder 103 form another closed working space, constituting a third-stage Stirling working unit. The mechanical energy output piston at the last stage Stirling working unit is connected to the mechanical energy output apparatus. The mechanical energy input apparatus is selected from various apparatuses that can drive the mechanical energy input piston to reciprocate, such as an electric motor, cyclically changing gas pressure difference, cyclically changing liquid pressure difference, a Stirling engine, etc., or a combination of several modes. The mechanical energy output apparatus is selected from various apparatuses for the output or utilization of mechanical energy, which can drive the mechanical energy output piston to reciprocate, such as power generator, cyclically changing gas pressure difference, cyclically changing liquid pressure difference, Stirling heat pumps, etc., or a combination of several modes. The above structures form one Stirling cycle machine system with three stages.

Embodiment 3

Figure 3:
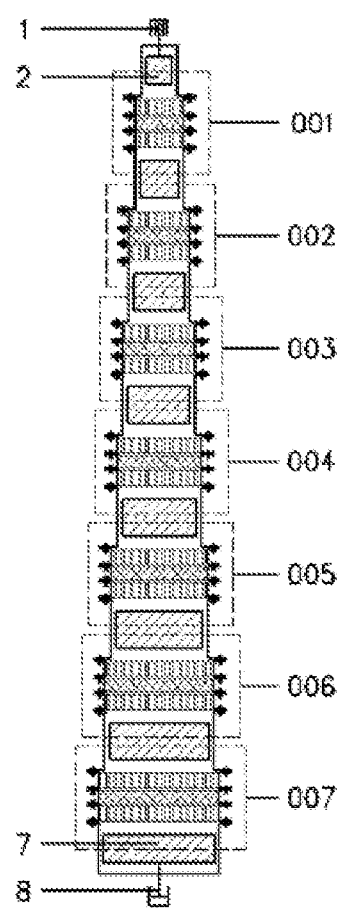
FIG. 3 is the schematic diagram of the multi-stage Stirling cycle machine according to the present invention.

A multi-stage Stirling engine that utilizes the waste heat of exhaust of an internal combustion engine. Biogas power generation generally uses an internal combustion engine, the exhaust temperature of the internal combustion engine is about 500° C., it is generally used for the thermal insulation of biogas tanks, due to the low waste heat required for thermal insulation in spring, summer and autumn every year, it is not fully utilized. In this embodiment, the exhaust is used to heat the temperature of the heat transfer oil from 300° C. to 350° C. as the heat source of the multi-stage Stirling engine, so as to realize the efficient utilization of the exhaust heat. The cold source adopts the thermal insulation water of the biogas tank, and the temperature of the thermal insulation water is heated from 50° C. to 90° C. to realize the utilization of low-temperature waste heat. The multi-stage Stirling engine of the present embodiment is shown in FIG. 3, the vertical arrangement is adopted, the mechanical energy input piston is arranged at the uppermost end, the mechanical energy output piston is arranged at the lowermost end, and mechanical energy transfer double-acting free pistons with six stages are arranged in between, forming Stirling engine with seven stages (001-007 in FIG. 3). The diameter of the mechanical energy input piston is 37.2 cm, the diameters of the mechanical energy transfer double-acting free pistons from top to bottom are 42.7 cm, 49.3 cm, 57.4 cm, 67.3 cm, 80 cm, 96 cm, and the diameter of the mechanical energy output piston is 120 cm. The mechanical energy input apparatus adopts a linear motor, and the mechanical energy output apparatus adopts a linear generator. The average pressure of the back pressure chamber of the mechanical energy input piston is 4 MPa, the average pressure of the gas in each closed space is gradually increased according to the weight of the piston per unit area, and the weight of each piston is borne by the pressure difference. The heat source medium passes through the heaters of the lower Stirling engine units with five stages in series from bottom to top, and then passes through the heaters of the upper Stirling engine units with two stages in parallel. The cold source is connected in a similar mode.

Operation mode: turn on the heat source and the cold source, adjust each piston to the equilibrium position, and the mechanical energy input apparatus applies periodic driving force with 30 HZ sinusoidal variation to the mechanical energy input piston, the mechanical energy input piston is input with a power of 27 kW for one cycle, and then the mechanical energy is input stably with a power of 38 kW, after 2 to 3 cycles, the mechanical energy output piston stably outputs a power of 380 kW, and the amplitude of each piston is about 2 cm.

Comparison solution is designed using the described prior art or other technologies similar thereto. Calculated according to the output power of per unit piston scavenging volume is the same as this embodiment, using the same piston amplitude to achieve the same effective output power, the comparison solution uses 600 double-acting pistons with a diameter of 7.7 cm.

The total area of the piston in this embodiment is 34147 $cm^2$, the comparison solution is 27949 $cm^2$, and the total area of the piston in this embodiment is 122% of the comparison solution; the total perimeter of the piston in this embodiment is 1726 cm, the comparison solution is 14514 cm, and the total perimeter of the piston in this embodiment is 12% of the comparison solution.

Although the piston area in this embodiment is slightly larger than that of the comparison solution, however, the surface processing area of the cylinder and piston is only 12% of the comparison solution; the gap between the piston and the cylinder of this embodiment is about 10 times that of the prior art, so that the machining accuracy requirement of this embodiment is lower than that of the prior art; in this embodiment, there are no parts with complicated shapes such as gas collecting pipes; this embodiment does not provide large springs. For the above reasons, the processing cost of this embodiment is much lower than that of the comparison solution.

The total length of the sealing ring in this embodiment is 12% of the prior art; the number of piston rods passing out of the cylinder is 2 in this embodiment, and 600 in the comparison solution. For the above reasons, the mechanical loss due to sealing in this embodiment is much lower than that in the prior art.

In this embodiment, one motor with 38 kW is used as the mechanical energy input apparatus, and one generator with 380 kW is used as the mechanical energy output apparatus; the comparison technology requires 600 generators with 0.57 kW or 100 generators with 3.42 kW and 100 sets of rotating mechanisms such as swash plates, etc. The above reasons make the cost of the motor and the supporting connecting mechanism in this embodiment far lower than that of the comparison solution.

In this embodiment, the stroke of each piston and the stroke of the mechanical energy input piston have a relatively fixed ratio relationship, and this ratio is less affected by external disturbances, the operation of this embodiment can be reliably controlled by adjusting the mechanical energy input apparatus, and the stability and adjustment performance of the operation of this embodiment are far superior to those of the prior art.

In this embodiment, the low-temperature waste heat meets the thermal insulation requirement of the biogas tank, and the total heating capacity of the thermal insulation water decreases by about 10%, the operating power of this embodiment needs to be reduced in order to ensure the heating capacity of the thermal insulation water only during the 20% or so of the year when the temperature is the lowest. Using this embodiment, the power generation of biogas power generation can be increased by more than 10%.

Embodiment 4

A multi-stage Stirling engine for realizing the combined supply of distributed electricity and hot water by using solar thermal energy. In factories with hot water needs, solar concentrators are installed on the factory floor to collect solar heat as a heat source for the multi-stage Stirling engine, so that electricity and hot water can be used nearby. Setting up a thermal energy storage system so that the power generation time and power can be adjusted as needed. The structure and parameters of the multi-stage Stirling engine are the same as the embodiment 3, and the following three operating modes are adopted as required:

1. The combined supply mode of electricity and hot water, the operation mode is similar to that of the embodiment 3;
2. The mode of pure power generation, in the time period when hot water is not needed, the cold source is changed to cooling water with 30° C., due to the increase in temperature difference, the mechanical energy input power is adjusted to 20 kW, and the mechanical energy output power is 380 kW.
3. The mode of emergency power generation, when the external power supply of the factory fails to provide normal power supply and the thermal energy storage is insufficient, the thermal energy storage potential can be further tapped by reducing the temperature of the heat source to achieve continuous power supply and ensure the basic power supply requirements such as the safe shutdown of the main equipment of the factory, the output power decreases as the temperature of the heat source decreases.

Compared with the conventional solar thermal power generation, the main advantages of this embodiment include: increasing the profit of hot water; reducing the loss of long-distance transmission of electricity and equipment investment; the heat transfer medium transmission pipeline is short, which reduces the investment and heat dissipation loss; replacing emergency power sources such as diesel generators, etc. The overall benefit of this embodiment is obvious.

The invention claimed is:
1. A multi-stage Stirling cycle machine, which comprises at least one set of piston working units, wherein said one set of piston working units comprises:
   a first cylinder and one mechanical energy input piston that is axially movable in the first cylinder;
   a second cylinder and one mechanical energy transfer double-acting free piston that is axially movable in the second cylinder;
   a last stage cylinder and one mechanical energy output piston that is axially movable in the last stage cylinder;
   the first cylinder is connected to the second cylinder in the axial direction through a first cooler, a first regenerator and a first heater, the second cylinder is connected to the last stage cylinder in the axial direction through a second cooler, a second regenerator, and a second heater, constituting a Stirling working unit with two stages, the mechanical energy transfer double-acting free piston is input the mechanical energy from the connected one stage Stirling working unit, in addition to overcoming the mechanical loss of the reciprocating motion of the piston and the working gas, all the mechanical energy is output to the connected next stage Stirling working unit during a complete operating period, realizing that the mechanical energy transfer double-acting free piston can only reciprocate under the action of the pressure change of the working gas of the Stirling working unit on both sides so as to achieve the purpose of canceling the piston rod apparatus.

2. The multi-stage Stirling cycle machine according to claim 1, wherein a mechanical energy input apparatus is arranged at one end of the multi-stage Stirling cycle machine, and the mechanical energy input apparatus is connected to the mechanical energy input piston and drives the mechanical energy input piston to act, a mechanical energy output apparatus is arranged at the other end of the multi-stage Stirling cycle machine, and the mechanical energy output apparatus is connected to the mechanical energy output piston.

3. The multi-stage Stirling cycle machine according to claim 1, wherein one or more cylinders are arranged in the axial direction between the second cylinder and the last stage cylinder, and each cylinder comprises one mechanical energy transfer double-acting free piston that can move in the axial direction, the cylinders are connected in the axial direction through a cooler, a regenerator and a heater so that the multi-stage Stirling cycle machine is a Stirling cycle machine with at least three stages.

4. The multi-stage Stirling cycle machine according to claim 2, wherein the mechanical energy input apparatus is selected from one or a combination of an electric motor, cyclically changing gas pressure difference, cyclically changing liquid pressure difference, a Stirling engine, connecting rod with mechanical energy output piston.

5. The multi-stage Stirling cycle machine according to claim 2, wherein the mechanical energy output apparatus is selected from one or a combination of a power generator, cyclically changing gas pressure difference, cyclically changing liquid pressure difference, a Stirling heat pump, connecting rod with mechanical energy input piston.

6. A steady-state operating parameter control method of the multi-stage Stirling cycle machine according to claim 1, wherein the parameter adjustment is carried out according to the following steps:
(1) selecting the amplitude of the piston and the phase angle between the pistons, and the phase angle between the pistons should not exceed 75°;
(2) selecting the average length of the back pressure chamber of the mechanical energy input piston and the average length of the back pressure chamber of the mechanical energy output piston, the average length should be such that the volume of the back pressure chamber is 3-8 times the volume of the adjacent Stirling unit;
(3) selecting the parameters of the cooler, regenerator and heater and calculating the volume of the cooler, regenerator and heater corresponding to per unit area of the piston;
(4) calculating and determining average pressure, area of each piston, piston mass of each Stirling unit by using forced vibration equations; and
(5) adjusting the operating parameters of the multi-stage Stirling engine.

7. The method according to claim 6, wherein the step (4) calculates and determines average pressure, area of each piston, piston mass of each Stirling unit according to the following process:

a. initially selecting the number of stages of the multi-stage Stirling cycle machine, the average pressure of each closed space and the area of each piston according to the mode that the area of the piston in the expansion chamber of the engine unit is larger than that of the piston in the compression chamber of the engine unit;
b. under the condition that the area of the mechanical energy output piston remains unchanged, adjusting the area of other pistons to make that the resultant force acting on each mechanical energy transfer double-acting free piston is 0 by using the equivalent linear stiffness and damping calculation when this piston runs to the equilibrium position;
c. calculating the driving force of the mechanical energy input apparatus and the damping of the mechanical energy output apparatus according to the condition that the resultant force acting on this piston is 0 by using the equivalent linear stiffness and damping calculation when the piston runs to the equilibrium position;
d. calculating the mass of each piston according to the resultant force of the acting force calculated by using the equivalent linear stiffness and the acceleration of the piston when each piston runs to the maximum displacement;
e. for vertically arranged multi-stage Stirling engines, adjusting the average pressure of each Stirling working unit and back pressure chamber according to the mass of each piston;
f. repeating the calculation from step b to step e until the ideal calculation result is obtained;
g. calculating mechanical energy input power and mechanical energy output power;
h. calculating the power loss caused by the efficiency of the mechanical energy input apparatus, and judging whether the ratio of the power loss caused by the efficiency of the mechanical energy input apparatus to the total output power meets the requirement, generally, in order to keep the power loss caused by the efficiency of the mechanical energy input apparatus within 5% of the total output power, the mechanical energy output power is required to be more than 10 times the mechanical energy input power; and
i. if the ratio of the power loss caused by the efficiency of the mechanical energy input apparatus to the total output power does not meet the requirement, increasing the number of stages of the multi-stage Stirling engine and repeating the above calculations.

8. The method according to claim 6, wherein the set of forced vibration equations of Stirling cycle machine in step (4) are:

$$m_1 x_1'' + c_1 x_1' + (k_{10} + k_{12}) x_1 - k_{21} x_2 = q \sin(\omega t)$$

$$m_2 x_2'' + c_2 x_2' - k_{12} x_1 + (k_{21} + k_{23}) x_2 - k_{32} x_3 = 0$$

$$\cdots$$

$$m_i x_i'' + c_i x_i' - k_{(i-1)i} x_{(i-1)} + (k_{i(i-1)} + k_{i(i+1)}) x_i - k_{(i+1)i} x_{(i+1)} = 0$$

$$\cdots$$

$$m_n x_n'' + c_n x_n' - k_{(n-1)n} x_{(n-1)} + (k_{n(n-1)} + k_{n(n+1)}) x_n = 0$$

wherein:
$m_1, m_2, \cdots, m_i, \cdots, m_n$ are the mass of per unit area of the mechanical energy input piston, each mechanical energy transfer double-acting free piston and the mechanical energy output piston;

ω is the circular frequency of the driving force of the mechanical energy input apparatus;

q is the maximum of the force of the mechanical energy input apparatus acting on the unit mechanical energy input piston;

t is time;

$x_1, x_2, \cdots, x_i, \cdots, x_n$ are the displacements of the mechanical energy input piston, each mechanical energy transfer double-acting free piston and the mechanical energy output piston, which are functions of time t;

$x_1', x_2', \cdots, x_i', \cdots, x_n'$ are the speeds of the mechanical energy input piston, each mechanical energy transfer double-acting free piston and the mechanical energy output piston;

$x_1'', x_2'', \cdots, x_i'', \cdots, x_n''$ are the accelerations of the mechanical energy input piston, each mechanical energy transfer double-acting free piston and the mechanical energy output piston;

$c_1, c_2, \cdots, c_i, \cdots, c_n$ are the equivalent damping of per unit area of piston of the mechanical energy input piston, each mechanical energy transfer double-acting free piston and the mechanical energy output piston; and $k_{10}, k_{12}$ are changes of pressure in the closed space on the upper and lower sides of the piston caused by the unit displacement of $x_1, k_{21}, k_{23}, k_{32}, k_{34} \cdots$ and so on.

9. The method according to claim 7, wherein the specific method of step (5) is as follows:

A. adjusting the mechanical energy output power by adjusting the mechanical energy input power;

B. adjusting the operating frequency requires adjusting the average pressure of the working gas at the same time;

C. adjusting the phase angle between the pistons requires adjusting the volume of back pressure chamber of the mechanical energy input piston and the volume of back pressure chamber of the mechanical energy output piston at the same time;

D. when the ratio of the absolute temperature of the heat source and the cold source increases, in order to maintain the output power unchanged, the mechanical energy input power needs to be reduced; and E. when the ratio of the absolute temperature of the heat source and the cold source decreases, in order to maintain the input power unchanged, the mechanical energy output power needs to be reduced.

10. A usage of a multi-stage Stirling cycle machine according to claim 1, wherein the multi-stage Stirling cycle machine is used for waste heat power generation, renewable energy power generation, building a distributed solar energy cogeneration apparatus and a small-scale cogeneration apparatus, microgrid power supply.

* * * * *